2,893,873
FONDANTS AND THE LIKE

Leo J. Novak, Dayton, Ohio, assignor, by mesne assignments, to The Midland Chemical Company, Wilmington, Del.

No Drawing. Application December 6, 1956
Serial No. 626,606

1 Claim. (Cl. 99—134)

This invention relates to confections and more particularly to grained confections such as fondant, fudge, grained caramels, grained marshmallows, etc.

Grained candies of this type contain fine sugar crystals surrounded by a saturated or supersaturated solution of sugar constituting a liquid or syrup phase which may also contain gelatinous substances. According to usual methods of making these grained candies, the solid sugar phase consists essentially of sucrose, and it is found that, due to the shape and compactness of the sucrose crystals, the supporting structure formed by them is comparatively low in absorptive capacity, which places a limit on the amount of liquid which may be present without making the candies undesirably moist to the touch.

This difficulty is overcome by the present invention in accordance with which the solid phase of the candies consists of or comprises a highly linear, water-soluble native dextran in which 94% to 97% of the total linkages are 1,6 linkages.

The native dextran used in making the present confections are produced by the action of certain specific dextran-synthesizing strains of Leuconostoc on sucrose present in an aqueous nutrient medium also containing appropriate inorganic salts, and is precipitated from the fermentate in the usual way, purified and used without subjecting it to hydrolyzing conditions. It has an extremely high molecular weight estimated to be in the millions. The strains of microorganisms which are used to produce the linear or substantially linear, water-soluble, native dextrans containing 1,6 linkages to the extent of 94% to 97% of the total linkages joining the anhydroglucose units making up the large dextran molecule are such as those bearing the following NRRL (Northern Regional Research Laboratories) designations: *Leuconostoc mesenteroides* B–1146, B–1064, B–1119, B–512, B–1066, B–1414.

It has been established by biological tests that, in the absence of sucrose, these particular linear or substantially linear native dextrans exert a retarding effect on the rate of gain in body weight. Therefore, in making up the confections of the present invention, the dextran is used without sucrose or other sugar for the solid phase of the confections and is flavored to taste with such sugar substitutes as "Sucryl" to obtain confections which can be consumed as a special dietetic confection which does not result in any marked gain in body weight and which, taken as a staple in a generally sucrose-free reducing diet, has the effect of stabilizing body weight or even bringing about a reduction in body weight where that is desirable and the general diet is otherwise modified for that purpose, as where a high protein diet essentially free of sugar is adhered to for a prescribed time.

It has been established that, in the presence of sucrose, the retarding or controlling effect on body weight otherwise exerted by these linear dextrans, is inhibited.

In making these dietetic confections, the usual procedure may be followed generally, except that the linear or substantially linear native dextran is mixed with "Sucryl" or other sugar substitute. The amount of water used is substantially the amount thereof to be present in the "Sucryl" solution constituting the liquid phase.

The following examples, in which the parts are by weight unless otherwise specified, are given to illustrate specific embodiments of the invention, it being understood that these examples are not limitative.

*Example I*

About 2.5 parts of gelatine and 20 parts of "Sucryl" are dissolved in about 30 parts of warm water. About 70 parts of particulate, purified, unhydrolyzed *L. m.* B–512 dextran are added to the solution. The mixture is heated to about 170° F. and then beaten in a nougat beater. The mass is cooled below 120° F., preferably to about 100° F., and allowed to stand for about 12 hours. Graining occurs without seeding. In the final confection, some of the dextran is dissolved in the water of the syrup phase together with the gelatine and Sucryl, but the bulk of the dextran remains in the solid phase. There is thus obtained a grained, soft candy which is palatable but does not contain sucrose and, in addition to being free of sugar, has in and of itself the capacity, resulting from the presence therein of the specific dextran, of retarding or controlling gain in body weight.

*Example II*

Example I is repeated, except that the dextran used is native, high molecular weight B–1146 dextran.

*Example III*

Caramels are made by melting together 25 parts of native unhydrolyzed B–512 dextran and 20 parts of native, unhydrolyzed B–1064 dextran. About 10 parts of powdered skimmed milk are added to the melt and the mixture is beaten to a smooth paste. Three parts of gelatine dissolved in 9 parts of water are added and the whole is beaten until the desired lightness is obtained.

An emulsion of 20 parts of cocoanut oil in 20 parts of Sucryl solution (containing 50% Sucryl) is mixed in, and the mixture is poured into trays.

In general, the confections of the invention, comprising the linear or substantially linear dextran in the solid phase, and which may be regarded as reducing aids, have advantages (aside from the favorable effect on body weight gain) over similar confections containing sucrose, in being smoother, comprising a solid phase of increased absorptive capacity so that the confection may comprise a larger amount of sweet-tasting liquid phase (containing Sucryl) without making the confection wet to the touch, increased softness, and better keeping qualities. The confection can be coated with "chocolate" made with Sucryl or other sugar substitute, if desired.

The retarding effect of the particular linear native dextrans on gain in body weight is believed to result from the fact that these specific dextrans are resistant to bacteria and enzymes in the gastrointestinal tract and, by forming a film over food particles present in the gastro-intestinal tract, retard breakdown of the food particles and assimilation and absorption thereof.

The present confections may be recommended for eating before meals, as a supplement to an essentially sugar-free reducing diet, or may be eaten as prescribed by a physician.

Although specific details have been given for illustrative purposes, it will be apparent that various changes and modifications may be made in details, such as the use of sugar substitutes other than "Sucryl" and the use of native linear water-soluble dextrans other than those described in the examples, without departing from the spirit and scope thereof. It is to be understood, therefore, that it is not intended to limit the invention, except as defined in the appended claim.

What is claimed is:

A sucrose-free confection having a solid phase consisting essentially of a water-soluble native substantially linear dextran in which 94% to 97% of the linkages joining the anhydroglucose units are 1,6 linkages, and a liquid phase consisting essentially of water having dissolved therein a sucrose-free sweetening agent.

References Cited in the file of this patent

UNITED STATES PATENTS

| | | |
|---|---|---|
| 2,089,217 | Mahoney | Aug. 10, 1937 |
| 2,171,244 | Otterbacher | Aug. 29, 1939 |
| 2,629,665 | Gordon | Feb. 24, 1953 |